United States Patent [19]

Himmler

[11] Patent Number: 4,918,983
[45] Date of Patent: Apr. 24, 1990

[54] APPARATUS FOR CHECKING MOTOR VEHICLE TIRES

[75] Inventor: Günther Himmler, Darmstadt, Fed. Rep. of Germany

[73] Assignee: Gebr. Hofmann GmbH & Co. KG Maschinenfabrik, Pfungstadt, Fed. Rep. of Germany

[21] Appl. No.: 344,593

[22] Filed: Apr. 28, 1989

[30] Foreign Application Priority Data

Apr. 29, 1988 [DE] Fed. Rep. of Germany ....... 3814646

[51] Int. Cl.$^5$ ............................................. G01M 17/02
[52] U.S. Cl. ..................................... 73/146; 73/862.04
[58] Field of Search ................ 73/146, 862.04, 862.54; 152/DIG. 20

[56] References Cited

U.S. PATENT DOCUMENTS

| 1,850,223 | 3/1932 | Castricum | 73/146 |
| 4,297,877 | 11/1981 | Stahl | 73/146 |

FOREIGN PATENT DOCUMENTS

| 2552339 | 5/1977 | Fed. Rep. of Germany | 73/146 |
| 3103342 | 8/1982 | Fed. Rep. of Germany | 73/146 |

Primary Examiner—Donald O. Woodiel
Attorney, Agent, or Firm—Cushman, Darby & Cushman

[57] ABSTRACT

In an apparatus for checking a motor vehicle tire the bead of a tire is subjected to a stretching effect by radially outwardly displaceable clamping jaws, and the compression force applied to the bead by the respective clamping jaws is measured by force measuring means. Each force measuring means comprises a radially movable frame structure in which a central force transmitting portion connected to the respective clamping jaw is supported movably in relation to outer portions of the frame structure by resiliently bendable support portions bearing strain gauges, in such a way that when a tire is clamped by the clamping jaws, the force transmitting portion is displaced, causing deformation of the support portions, such deformation being measured by means of the strain gauges. The force transmtting portion is supported in the frame structure in such a way that it is substantially insensitive to movements and transverse forces which can result from radial guidance for the clamping jaws.

8 Claims, 2 Drawing Sheets

APPARATUS FOR CHECKING MOTOR VEHICLE TIRES

BACKGROUND OF THE INVENTION

With modern developments in the motor vehicle industry, motor vehicle tires can no longer be considered as just as accessory to a motor vehicle, but are in fact an important design element in the vehicle. Satisfactory tire fitment is an imperative requirement from the point of view of safety and the handling qualities of the vehicle at the higher speeds which can be attained nowadays. However, in the production of motor vehicle tires, deviations from the desired tire shape which can have major effects on the handling characteristics and safety of the vehicle, are usually inevitable, due to the production procedures involved. Besides the conventional checking methods such as ascertaining unbalance and measuring radial and lateral run-out, checking tires in regard to uniformity in respect of their behaviour when subjected to various forces, and in regard to bead characteristic values, is becoming an aspect of increasing significance. In particular the bead contact pressure with which the tire is carried on the rim is as aspect of major significance. Particularly when a vehicle is travelling at high speeds or negotiating a curve, the tire is subjected to high forces which tend to pull it off the rim. If those forces overcome the resisting resilient forces of the tire and the air pressure therein, then the result is the feared rim-off effect which involves the tire jumping off the rim of the wheel. On the other hand the pressure forces with which the tire is carried on the wheel rim may not exceed certain values in order for the tire to be removable.

German patent specification No 1 773 367 discloses an apparatus for checking motor vehicle tires, in particular with a view to avoiding the rim-off effect referred to above. That apparatus involves clamping means which can be applied against the inside bead of the tire, being distributed around the periphery of a circle in relation thereto, and are displaceable in an outward direction. The apparatus further includes force measuring means which are associated with each of the clamping means, for measuring and recording, in relation to the respective angular position on the periphery of the tire, the compression forces with which the clamping means, in the form of clamping jaws, are pushed against the inside bead of the tire, covering the same distances in that operation. That makes it possible to arrive at an accurate picture of the bead characteristics.

SUMMARY OF THE INVENTION

An object of the invention is to provide an apparatus for checking a motor vehicle tire, which provides an improved result with a higher degree of measuring accuracy.

Another object of the present invention is to provide a motor vehicle tire checking apparatus which is better suited to detecting the forces to which the tire is subjected in the checking operation.

Still another object of the present invention is to provide a motor vehicle tire checking apparatus which is better adapted to preventing forces involved in the checking operation circumventing force measuring means forming part of the apparatus.

Yet a further object of the present invention is to provide a motor vehicle tire checking apparatus which is adapted to produce a more accurate test result by virtue of substantial insensitivity to incidental forces involved in a checking operation.

In accordance with the present invention these and other objects are attained by an apparatus for checking a motor vehicle tire comprising a plurality of clamping means distributed around the periphery of a circle and adapted to bear against the internal bead of a tire, with the clamping means being displaceable in a radial direction. A force measuring means is associated with each of the clamping means and, when the clamping means is moved radially outwardly, detects the compression force applied to the respective inner circumferential angular region of the tire bead by the respective clamping means. Each said force measuring means includes a measuring body comprising a frame structure comprising outer portions, a substantially central force transmission portion and resiliently bendable support portions supporting the central force transmission portion between the outer portions. The central force transmission portion is connected to the respective clamping means and the resiliently bendable support portions extend substantially perpendicularly to the direction of the force applied through the force measuring means to the respective clamping means. The support portions carry strain gauges which are connected to form a measuring bridge.

As will be seen in greater detail hereinafter, the apparatus configuration according to the invention provides for accurate measurement of the compression forces which are transmitted to the internal bead of the tire in the checking operation, without such measurement being falsified by virtue of forces being transmitted through the arrangement in such a way as not to act on the strain gauges. A further advantage of the arrangement according to the invention is that strain gauges can be used as the force detecting means instead of for example piezoelectrical elements which are used in a previous arrangement. The difficulty with piezoelectric elements is that under some circumstances they exhibit drift phenomena which make it difficult to perform static measurement operations. In the arrangement according to the invention the locations at which the strain gauges are disposed are so selected that moments and forces which could falsify the measurement results are substantially eliminated and the forces to be detected by the strain gauges are not influenced by such falsifying moments and forces. For that purpose, the compression force is applied to the respective clamping means by way of a force transmission portion disposed in the radially extending central plane of the above-mentioned measuring body. The clamping means is preferably in the form of a clamping jaw which is of a profile closely similar to that of a wheel flange portion, in the region of the surface of the clamping jaw at which it bears against the internal bead of the tire. The force transmission portion is supported on the frame structure of the measuring body by way of the resiliently bendable support portions which thus extend perpendicularly to the direction in which the force is applied to the bead of the tire, with the strain gauges being carried thereon.

For that purpose, each measuring body preferably comprises four strain gauges connected to form a measuring bridge, on the resiliently bendable support portions. The strain gauges are preferably arranged in relation to the radially extending central plane of the measuring body, in such a way that there are two strain gauges at each of the two sides of that plane, on the support portions.

In a preferred feature of the invention the support portions are arranged in such a way that they provide that the force transmission portion is supported in relation to the frame structure of the measuring body, by a parallel linkage-type arrangement.

The assembly of the support portions preferably includes two support portions arranged in the immediate vicinity of the respective clamping means, and two support portions which are arranged at a greater spacing therefrom. In each of those two pairs of support portions, one support portion is arranged on one side of the horizontal central plane of the measuring body while the other support portion is arranged on the other side. When the measuring arrangement is disposed horizontally therefore the support portions are disposed above and below the longitudinal central plane of the measuring body. The strain gauges are preferably carried on the two support portions which are remote from the clamping jaw forming the clamping means.

In a preferred feature, the resiliently bendable support portions are of a plate-like configuration.

The support portions and the force transmission portion are only supported in the frame structure of the measuring body, being free of any radial guidance therein. The measuring body radially slidably guides the frame structure therein, more specifically, an upper horizontally extending outer portion and a lower horizontally extending outer portion of the frame structure are guided in a radial guide arrangement which can be in the form of radial guide passages, on a top surface, a bottom surface and lateral surfaces of the measuring body. The force transmission portion and the support portions are at a given spacing in relation to the guide surfaces provided by the radially extending guide passage in the measuring body so that the force transmission portion and the support portions are not impeded in their movement in the frame structure of the measuring body, that is to say they are not affected by forces and moments which can occur when the measuring body, with the clamping means connected thereto, is displaced radially outwardly to clamp against a tire bead.

To perform the checking operation, the clamping jaws must be moved radially outwardly over the same distances. For that purposes, the apparatus may include an actuating means which is common to all the measuring bodies and associated clamping means, to apply a radially outwardly directed thrust force thereagainst. The actuating means may be a ram member which is capable of producing a stroke movement and which is of a conical configuration, adapted to engage against corresponding thrust faces on the frame structure of each measuring body, whereby, upon the stroke movement of the ram member, the measuring bodies together with the associated clamping jaws are simultaneously displaced radially outwardly over the same distances. In that arrangement the force for actuating the apparatus is applied to the clamping means in such a way that the flow of force is by way of the frame structure of each measuring body, the associated support portions and the central force transmission portion, to the clamping jaws. The compression forces which are thus applied to the internal bed of the tire are measured by the strain gauges, due to the resilient bending deformation of the support portions which occurs in that situation.

Further objects, features and advantages of the present invention will be apparent from the following description of a preferred embodiment of the invention.

DESCRIPTION OF THE PREFERRED EMBODIMENT

Figure 1:
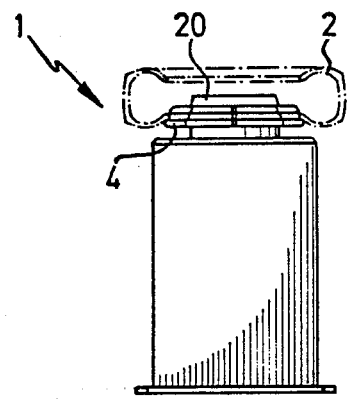
FIG. 1 is a side view of a motor vehicle tire checking apparatus incorporating the principles of the present invention.
Figure 2:
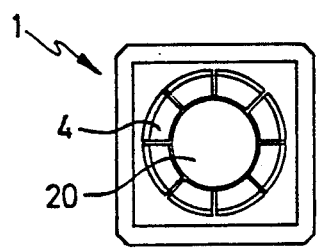
FIG. 2 is a plan view of the FIG. 1 apparatus.

Referring firstly to FIG. 1, shown therein is a checking apparatus generally indicated by reference numeral 1, for determining bead characteristics in respect of a motor vehicle tire. In use of that apparatus, a motor vehicle tire 2 to be tested is disposed in a horizontal position, with its tire bead to be checked downwardly, on clamping means 4 which are distributed around the circumference of a circle and which form a bead receiving configuration which approximately corresponds to that of one half of a wheel rim arrangement. In the illustrated embodiment, the apparatus has eight clamping means 4 which are displaceable radially and which each provide a clamping jaw which approximates to the shape of a segment of a wheel rim. The clamping means 4 are adapted to be urged radially outwardly to engage the internal bead of a tire 2.

Each rim segment 4 can be releasably secured by screw means to a measuring body 3 to permit checking of different sizes of tire with the same measuring bodies 3. The measuring bodies 3 and the clamping means 4 may also be formed integrally with each other.

When the clamping means 4 are simultaneously displaced radially outwardly over the same distances, the tire bead is stretched and opposes that stretching effect by means of a force which can thus be measured. For that purpose, operatively associated with each of the clamping means 4 is a respective force measuring means which is of a construction as shown in FIG. 3, together with a clamping means 4.

Figure 3:
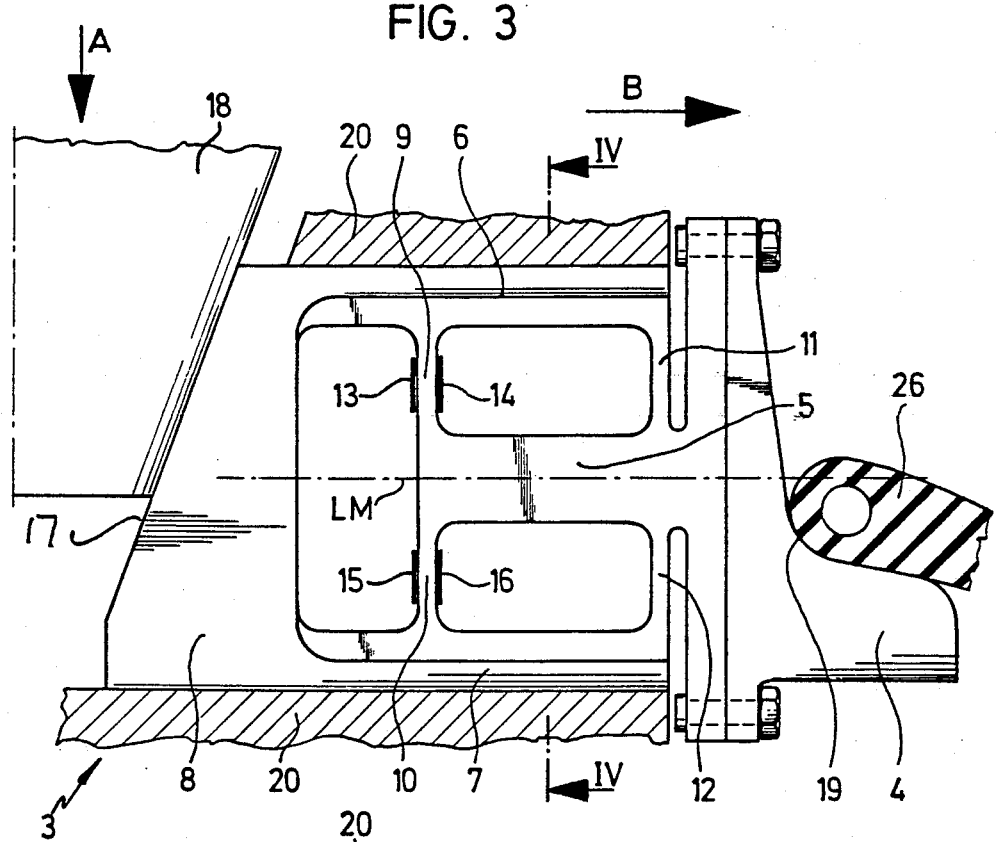
FIG. 3 is a partly sectional view of a force measuring arrangement operating in accordance with the principles of the invention and forming part of a motor vehicle tire checking apparatus as shown in FIGS. 1 and 2.

Referring now to FIG. 3, the force measuring means illustrated therein comprises the measuring body 3 which includes a frame structure made up of an upper horizontally extending outer portion 6, a lower horizontally extending outer portion 7 and a substantially vertically disposed frame portion 8. The frame structure 6, 7 and 8 is guided in a radial guide arrangement 20 provided by the measuring body 3. For that purpose, as can be clearly seen from FIG. 4, the upper outer portion 6 and the lower outer portion 7 of the frame structure bear against a top surface and a bottom surface of the radial guide arrangement 20. The radial guide arrangement 20 thus includes a radial guide passage 21 which extends radially through the body 3 providing the guide arrangement.

Referring again to FIG. 3, the vertical frame portion 8 has an inclinedly extending thrust surface 17 at the end of the measuring body 3 which is remote from the clamping means 4. The apparatus includes an actuating means indicated at 18 in the form of a thrust ram member which is of a fructoconical configuration in its operative portion, the frustoconical surface of the ram member 18 thus being co-operable with the thrust surface 17 on each of the frame portions 8.

The ram member 18 is moved in the axial direction as indicated by the arrow A in FIG. 3 by a suitable actuator (not shown), for example a hydraulic piston cylinder unit. It will be seen therefore that, as the ram member 18 moves downwardly in FIG. 3, in the direction indicated by the arrow A, it will move each of the frame structures 6, 7 and 8 radially outwardly, as indicated by the arrow B.

A central force transmission portion 5 is supported in the frame structure 6, 7 and 8 of the measuring body 3 by means of support portions 9, 10, 11 and 12. It will be clearly seen from FIG. 3 that the support portions are arranged in respective pairs 9, 10 and 11, 12. The force transmission portion 5 is disposed in a horizontal longitudinal central plane as indicated by LM and provides for connecting the measuring body 3 to the clamping means 4, for the transmission of forces therebetween.

Figure 4:
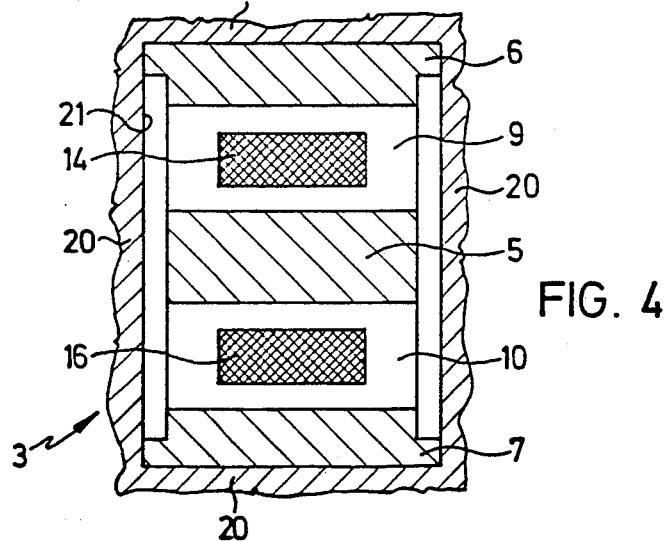
FIG. 4 is a view in section taken along line IV—IV in FIG. 3.

The support portions 9, 10, 11 and 12 are of a resiliently bendable nature and, as shown in the illustrated embodiment, may each be in the form of a plate portion (see more specifically FIG. 4). It would also be possible for each of the support portions to be in the form of a spring bar portion but that will generally involve additional expenditure in manufacture, in comparison with a plate-like configuration for the support portions.

The support portions 9, 10, 11 and 12 provide a support arrangement which is operative in the manner of a parallel linkage arrangement, to support the force transmission portion 5 between the upper outer portion 6 and the lower outer portion 7. For that purpose the two support portions 11 and 12 which are immediately adjacent the rear surface of the clamping means 4 extend sustantially in a vertical direction, perpendicularly to the plane LM of the measuring body 3. The support portion 11 is arranged above the plane LM while the support portion 12 is arranged below the plane LM. The two support portions 11 and 12 are disposed at only a small spacing from the rear face of the clamping means 4 so as to ensure that there is a certain degree of free movement for the clamping means 4, when the internal bead of the tire as indicated at 26 is subjected to a stretching effect by operation of the apparatus. The clamping means 4 is held at the above-mentioned spacing from the two support portions 11 and 12 by the centrally disposed force transmission portion 5.

The other two support portions 9 and 10 extend parallel to the support portions 11 and 12 and are thus at a greater spacing from the clamping means 4 than the support portions 11 and 12. The support portions 9 and 10 carry strain gauges 13, 14, 15 and 16 which are each disposed on a respective side of one of the support portions 9 and 10. In the illustrated embodiment the arrangement is such that the support portion 9 is disposed above the plane LM while the support portion 10 is disposed below the plane LM.

As can be seen more particularly from FIG. 4, the support portions 9, 10, 11 and 12 and the force transmission portion 5 are arranged in the radial guide passage 21 formed by the guide arrangement 20, in such a way that they are at a spacing with respect to the guide surfaces of the guide passage 21 and are thus only supported between the upper outer portion 6 and the lower outer portion 7, whereby the force transmission portion 5 is guided in the manner of the parallel linkage arrangement already referred to above. Further reference will be made to the way in which the force transmission portion 5 is moved and supported in a tire checking operation, hereinafter in this description.

Figure 5:
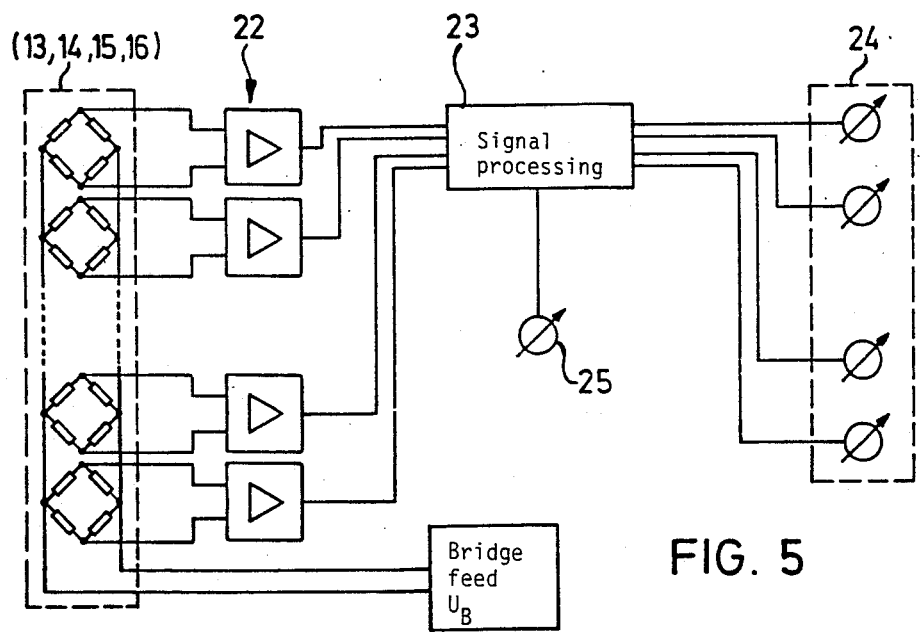
FIG. 5 is a block circuit diagram of a circuit arrangement for processing the measurement signals produced by the checking apparatus for display thereof.

The strain gauges 13, 14, 15 and 16 operatively associated with each measuring body 3 and clamping means 4 are connected to form a measuring bridge, so that there is a respective measuring bridge for each measuring body 3. Reference will now be made to FIG. 5 showing the measuring bridges operatively associated with four force measuring means. It will be appreciated that the apparatus may include a greater number of force measuring means arranged in such a way as to be distributed around the internal bead of a tire to be checked, depending on the number of clamping means in the apparatus. That option of providing a greater number of force measuring means and associated measuring bridges is indicated by the dashed lines shown in FIG. 5, between the measuring bridges illustrated therein.

The mode of operation of the above-described apparatus and its force measuring means in a checking operation is as follows:

In order for the individual clamping means 4 to be jointly moved radially outwardly by the same distances, the ram member 18 is moved axially downwardly in the direction indicated by the arrow A in FIG. 3 by its actuating arrangement (not shown). As the measuring bodies 3 all bear by way of their thrust surfaces 17 against the common ram member 18, they are thus simultaneously moved radially outwardly in the direction indicated by the arrow B in FIG. 3. A stretching force is applied to the respective regions 26 of the internal bead of the tire, which bear against the respective clamping means 4 in a contact region indicated at 19 in FIG. 3. The flow of force between the ram member 18 and the internal bead of the tire to be checked is by way of the frame portion 8 and the two frame portions 6 and 7 which, as can be seen from FIG. 4, and guided in the radially extending guide passage 21 of the guide configuration 20. From there the force applied to the arrangement goes by way of the support portions 9, 10, 11 and 12 into the force transmission portion 5. It will be noted again at this point that the support portions 9, 10, 11 and 12 and the force transmission portion 5 are only supported in the frame structure 6, 7 and 8 and are not guided by co-operating with surfaces of the guide passage 21. As the force transmission portion 5 is fixedly connected in one piece to the clamping means 4 by way of a suitable connecting portion, the force required for stretching the bead of the tire to be checked is applied to the clamping means 4 and the bead 26 to be checked.

As shown in FIG. 3, the plane LM of the illustrated measuring body 3, being the plane in which the force transmission portion 5 is disposed, is displaced in relation to the contact region 19 of the clamping means 4 against which the bead 26 to be stretched bears, with the plane LM being displaced relative to the region 19, in a direction towards the central plane of the tire. That configuration provides that, when the tire bead is subjected to a stretching effect, a moment is produced, which results in bending of the resiliently bendable support portions 9, 10, 11 and 12, with the support portions 9 and 10 being bent to a greater degree than the support portions 11 and 12 as they are further away from the connection between the clamping means 4 and the force transmission portion 5, than the support portions 11 and 12. It is for that reason that the strain gauges 13, 14, 15 and 16 are preferably disposed on the support portions 9 and 10.

Deformation of the support portions 9 and 10, which occurs when the internal bead of the tire is subjected to the stretching effect, is detected by the strain gauges 13, 14, 15 and 16. That deformation is proportional to the compression force transmitted by each respective clamping means 4. Each measuring body 3 has associated therewith a measuring bridge formed from the respective strain gauges 13, 14, 15 and 16, with FIG. 5 showing four such measuring bridges. In practice, four force measuring devices (measuring body 3 and associated components) which are distributed uniformly around the internal circumference of the bead of the tire to be checked are sufficient to determine the bead characteristics. If there is a need for a higher degree of accuracy, for example when carrying out laboratory investigations, then the apparatus may include a greater number of force measuring means.

Referring to FIG. 5, a common measuring bridge voltage source UB is provided for the measuring bridges 13, 14, 15 and 16. The bridge output signals are passed by way of associated amplifier means 22 to a signal processing circuit 23 of a suitable configuration in which the signals can be processed in such a way that they are suitable to provide a display in respect of the detected compression forces, possibly in relation to circumferential angle on the tire. A circumferential angle-related display of that nature may be provided in a suitable display arrangement 24.

It is however also possible to form the arithmetic mean of all forces acting on the bead of the tire to be checked, for example by means of a mixer device in the circuit 23, with that arithmetic mean then being displayed in a suitable display device for the radial clamping force which is produced in that way, as indicated at 25 in FIG. 5.

The above-described and illustrated checking apparatus may be used to ascertain any bead characteristics which are required to be known. That substantially involves the capacity for fitting of the tire on a motor vehicle wheel, which capacity can be ascertained by carrying out a checking operation in which a given maximum force is not to be exceeded, to produce a predetermined stretching effect in the tire bead. It is also possible to carry out a checking operation in regard to the above-mentioned rim-off effect in which, with a given total force applied to the tire bead, the tire bead is only to stretch by a certain amount. In addition the bead must have the same degree of elasticity at all points on its periphery, in other words, when it is subjected to the stretching effect, it is not to yield to a greater degree at some point on its internal periphery, than at any other point.

The measurement results which are obtained by means of the apparatus according to the invention are extremely expressive as each force measuring means uses a respective measuring body 3 in which the support portions 9, 10, 11 and 12 with the strain gauges 13, 14, 15 and 16 support the force transmission portion 5 connected to the clamping means, in such a way that it is substantially insensitive to moments and transverse forces which could result from the clamping means 4 or the measuring body 3 being radially guided in a positive fashion.

It will be appreciated that the above-described construction has been set forth solely by way of example and illustration of the principles of the present invention and that various modifications and alterations may be made therein without thereby departing from the spirit and scope of the invention.

We claim:

1. Apparatus for checking a motor vehicle tire comprising:

clamping means disposed in a circular array and adapted to be displaced in a radially outward direction to bear against the internal bead of a tire to be checked;

force measuring means each associated with a respective clamping means and adapted, in the radially outward movement of the clamping means, to detect the compression force applied to the respective inner circumferential angular region of the tire bead by each clamping means, each force measuring means including a measuring body, a frame structure radially movably guided in the measuring body, a substantially central force transmission portion connected to the respective clamping means to be disposed within said frame structure, a plurality of resiliently bendable support portions supporting said force transmission portion is relation to said frame structure and extending substantially perpendicularly to the direction of the applied force, and strain gauges carried on respective ones of said support portions and connected to form a measuring bridge; and a display means for displaying the detected compression forces.

2. Apparatus as set forth in claim 1 wherein said support portions support said force transmission portion in the manner of a parallel linkage arrangement.

3. Apparatus as set forth in claim 1 wherein said support portions form first and second pairs disposed at different spacings from said respective clamping means, and wherein said strain gauges are disposed on the pair of support portions which is remote from said clamping means.

4. Apparatus as set forth in claim 1 wherein said clamping means comprises a clamping jaw integral with said measuring body.

5. Apparatus as set forth in claim 4 wherein said frame structure has a thrust surface, and further comprising a thrust means adapted to bear against said thrust surface to produce radial displacement of said frame structure.

6. Apparatus as set forth in claim 1 wherein each said clamping means has a contact region with which said clamping means bears against said tire bead and wherein a longitudinal central plane of said force transmission portion is displaced axially towards the central plane of the tire to be checked, relative to said contact region.

7. Apparatus as set forth in claim 1 wherein said support portions and said force transmission portion are free from radially extending guide surfaces in said measuring body whereby said force transmission portion is guided in the radial direction only by virtue of the support action afforded by the support portions.

8. Apparatus for testing a motor vehicle tire comprising:

a support structure;

a plurality of clamping jaws disposed in a circular array on the support structure;

actuating means for displacing the respective clamping jaws radially outwardly in relation to said circular array, thereby to bring them into contact against the bead of a tire to be tested;

a plurality of force measuring means each associated with a respective said clamping jaw and operable to detect the compression force applied to a respective portion of said tire bead by the clamping jaw when said clamping jaws are moved radially outwardly, each said force measuring means comprising: a support body portion; a movable structure engageable by said actuating means and slidable in said support body portion in guided relationship therewith in said radially outward direction, the respective clamping jaw being carried by said movable structure, the movable structure comprising a frame means defining a space therewithin, a force transmission portion disposed within said space and operatively connected to said clamping jaw, and a plurality of flexurally resilient support portions oxtending substantially perpendicularly to the direction of actuation of said movable structure and connecting said force transmission portion to said frame means while permitting movement of said force transmission portion relative to said frame means by virtue of resilient flexural deformation of said support portions; and strain gauge means disposed on the said support portions and connected into a measuring bridge configuration; and display means for displaying the forces detected by the force measuring means.

* * * * *

UNITED STATES PATENT AND TRADEMARK OFFICE
CERTIFICATE OF CORRECTION

PATENT NO. : 4,918,983
DATED : April 24, 1990
INVENTOR(S) : Gunther HIMMLER; Uwe MONCH It is certified that error appears in the above-identified patent and that said Letters Patent is hereby corrected as shown below:

On the title page:

[75] Inventor: Gunther Himmler, Darmstadt, Fed. Rep. of Germany; Uwe Monch, Pfungstadt, Fed. Rep. of Germany Signed and Sealed this Ninth Day of July, 1991

Attest:

HARRY F. MANBECK, JR.

*Attesting Officer*  *Commissioner of Patents and Trademarks*